United States Patent [19]

Ninomiya et al.

[11] Patent Number: 4,760,446
[45] Date of Patent: Jul. 26, 1988

[54] METHOD AND APPARATUS FOR DETECTING THE MOTION OF IMAGE IN A TELEVISION SIGNAL

[75] Inventors: Yuichi Ninomiya, Kawasaki; Seiichi Gohshi, Komae, both of Japan

[73] Assignee: Nippon Noso Kyokai, Tokyo, Japan

[21] Appl. No.: 102,435

[22] Filed: Sep. 29, 1987

[30] Foreign Application Priority Data

Sep. 30, 1986 [JP] Japan ................... 31-230126

[51] Int. Cl.⁴ ............................................. H04N 7/12
[52] U.S. Cl. ..................................... 358/105; 358/136
[58] Field of Search ............... 358/105, 135, 136, 138

[56] References Cited

U.S. PATENT DOCUMENTS

| | | | |
|---|---|---|---|
| 4,337,481 | 6/1982 | Mick et al. | 358/105 |
| 4,364,087 | 12/1982 | Storey et al. | 358/105 |
| 4,482,970 | 11/1984 | Barry | 358/105 X |
| 4,663,665 | 5/1987 | Tanaka et al. | 358/105 X |

FOREIGN PATENT DOCUMENTS

0264889 11/1986 Japan.

Primary Examiner—Howard W. Britton
Assistant Examiner—Victor R. Kostak
Attorney, Agent, or Firm—Antonelli, Terry & Wands

[57] ABSTRACT

A method and apparatus for detecting the motion of image in a television signal is intended for a decoder of a multiple subsampling transmission signal without an interframe aliased portion in a lower frequency region. In the method and apparatus for detecting the motion, a next-adjacent interframe difference signal, an immediate-adjacent interframe difference narrow-band signal and an immediate-adjacent interframe difference broad-band signal or compensated versions of these signals are combined with maximum-value selection circuits and a minimum-value selection circuit for selecting the maximum-value and minimum-value among these three sets of signals so that a proper motion signal is extracted from the transmission signal.

5 Claims, 3 Drawing Sheets

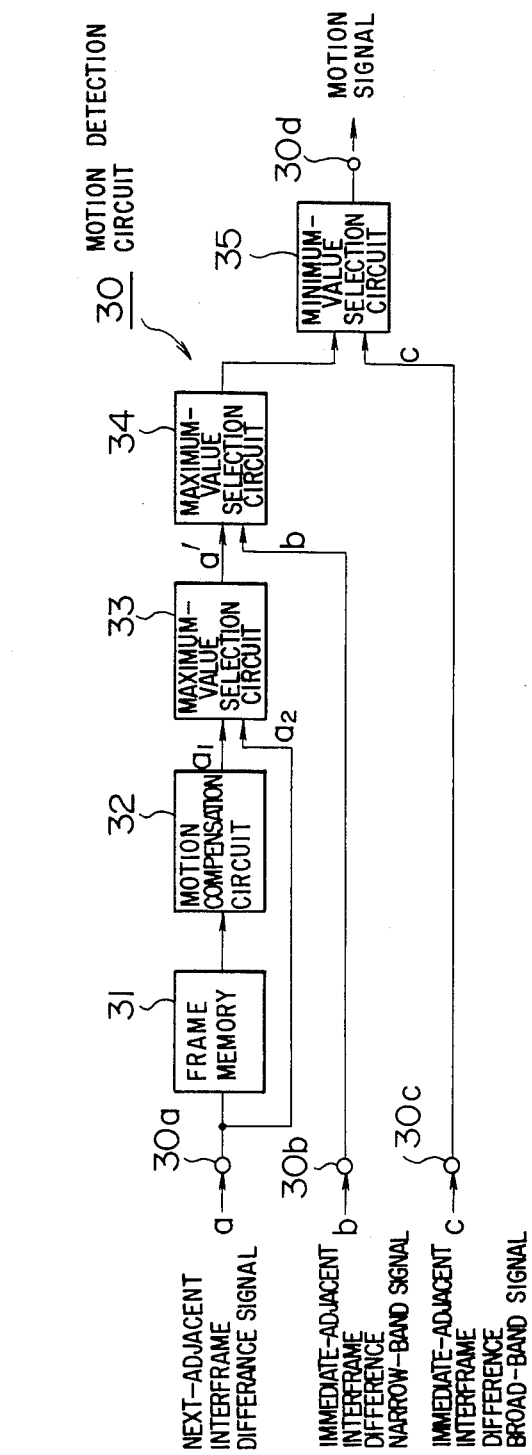
F I G. 3

METHOD AND APPARATUS FOR DETECTING THE MOTION OF IMAGE IN A TELEVISION SIGNAL

BACKGROUND OF THE INVENTION

The present invention relates to a method and apparatus for detecting the motion of image in a bandwidth-compressed television transmission signal which does not include the interframe aliased portion in the lower frequency region, and particularly to a method and apparatus for the image motion detection intended for the decoder in the receiver for receiving the compressed television transmission signal.

One of methods for transmitting a television signal, particularly a high definition television signal, by bandwidth compression is the multiple subsampling transmission system which implements offset subsampling between frames and between fields. An example of this system called MUSE (Multiple Sub-Nyquist Sampling Encoding) is practiced currently and it accomplishes effective bandwidth compression. The MUSE system is described in detail in the technical study report of The Institute of Electronics and Communication Engineers of Japan, Graphic Engineering IE 84–72. In the above-mentioned transmission system, subsampling cycles in two frames and therefore the receiver cannot use a difference signal for immediately adjacent frames (because of absent partner of comparison) and has to use a difference signal between next adjacent frames in detecting the motion of image, resulting in an inaccurate motion detection. With the intention of overcoming the above problem and yet simplifying the receiver and improving the picture quality, the applicant of the present invention has proposed a multiple subsampling transmission system which implements the motion detection using the difference signal for immediately adjacent frames (refer to Japanese Patent Unexamined Publication No. 264889/86 (JP-A-61-264889)).

The above-mentioned proposal resides in the multiple subsampling transmission system which compresses the transmission bandwidth by offset subsampling between fields and between frames, wherein the television picture signal is initially subjected to interfield offset subsampling, and the resulting signal is processed with a low-pass filter having a cut-off frequency half the sampling frequency of interfield offset subsampling, and then the filtered signal is subjected to frequency conversion and interframe offset subsampling at a frequency lower than twice the low-pass filter cut-off frequency. The produced transmission signal does not include the interframe aliased portion in the lower frequency region, enabling a low-frequency component signal extracted in the receiver to produce the interframe difference signal (difference signal for immediately adjacent frames) as a motion signal, whereby accurate motion detection is accomplished.

However, even the above transmission system is imperfect in motion detection in some cases, particularly when a small portion of picture has moved, and with the intention of improving the accuracy of motion detection, the applicant of the present invention has proposed "method of detecting the motion of image in the multiple subsampled transmission signal" in Japanese Patent Unexamined Publication No. 172876/87 (JP-A-62-172876).

According to the motion detection system of the Japanese Patent Unexamined Publication No. 172816/87, the decoder of the multiple subsampling transmission system without including the interframe aliased portion in the lower frequency region (proposed in Japanese Patent Unexamined Publication No. 264889/86) operates to switch the band of the immediate-adjacent interframe difference detection signal for producing the motion detection signal to a region which includes the aliased portion or a region which does not include to depending on the result of detection for the next-adjacent interframe difference (a difference between next adjacent frames). The switching operation, in case the detected next-adjacent interframe difference is significant having a magnitude higher than the reference level, allows the band of the motion detecting immediate-adjacent interframe difference signal to be intermingled with a component higher than the cut-off frequency (e.g., 4 MHz) of the low-pass filter used in the decoder of the Japanese Patent Unexamined Publication No. 264889/86, namely the aliased portion, so as to achieve accurate motion detection for smaller portions, while ensuring an immediate-adjacent interframe difference signal without the aliased portion for the case of a fast movement of a larger object, thereby stabilizing the motion detection.

However, among three signals (the next-adjacent interframe difference signal, immediate-adjacent interframe difference narrow-band signal and immediate-adjacent interframe difference broad-band signal), when one (e.g., next-adjacent interframe difference signal) is used dominantly as the above-mentioned motion signal, the system becomes increasingly dependent on the dominating signal. For example, when small portions of picture move right and left due to the slow swing of the television camera or the like, the dominating next-adjacent interframe difference signal will be made valid or invalid alternately. If this phenomenon occurs at every frame, the pixelwise motion signal will become unstable, with its state changing in every frame. Consequently, the motion signal is switched to match with the unstable dominating signal, resulting likely in a deteriorated picture. Therefore, it is necessary to use the above-mentioned three signals appropriately as a motion signal, instead of using one signal dominantly which causes the motion signal to become unstable.

SUMMARY OF THE INVENTION

It is an object of the present invention to provide a method and apparatus for detecting the motion of image in the television signal, which alleviate the deterioration of picture and operate more stably as compared with the conventional motion detection system even when small portions of picture swing due to the swing of the television camera.

The image motion detection method of the present invention resides in the multiple sampling transmission system which transmits the television signal with its bandwidth compressed so as not to include the interframe aliased portion in the lower frequency region, wherein three signals including a next-adjacent interframe difference signal, immediate-adjacent interframe difference narrow-band signal without the interframe aliased portion and immediate-adjacent interframe difference broad-band signal with the interframe aliased portion are generated, the maximum-value is taken between prescribed two signals among the next-adjacent interframe difference signal or a signal related thereto, the immediate-adjacent interframe difference narrowband signal or a signal related thereto, and the immediate-adjacent interframe difference broad-band signal or a signal related thereto, the minimum-value is taken between the resulting maximum-value signal and the remaining signal other than the above two signals, and the resulting minimum-value signal is validated as a motion signal which indicates the motion of image.

The image motion detection apparatus of the present invention in intended for the decoder within a television receiver for decoding the television transmission signal which has been bandwidth compressed based on the multiple subsampling transmission system and does not include the interframe aliased portion in the lower frequency band. The decoder is premised to include a signal generation circuit for generating from the television transmission signal a next-adjacent interframe difference signal or a signal related thereto, an immediate-adjacent interframe difference narrow-band signal without the interframe aliased portion or a signal related thereto and an immediate-adjacent interframe difference broad-band signal with the interframe aliased portion, and the decoder further includes an image motion detecting device for detecting the motion of image in the transmission signal comprising a first maximum-value selection circuit which receives the next-adjacent interframe difference signal or the related signal and the immediate-adjacent interframe difference narrow-band signal or the related signal to select the maximum-value between the signals, and a minimum-value selection circuit which receives the immediate-adjacent interframe difference broad-band signal and the output signal from the first maximum-value selection circuit to select the minimum-value between the signals, with the signal obtained finally being validated as a motion signal indicating the motion of image.

BRIEF DESCRIPTION OF THE DRAWINGS

FIG. 3 is a block diagram showing the image motion detection circuit embodying the present invention.

DESCRIPTION OF THE PREFERRED EMBODIMENT

Figure 1:
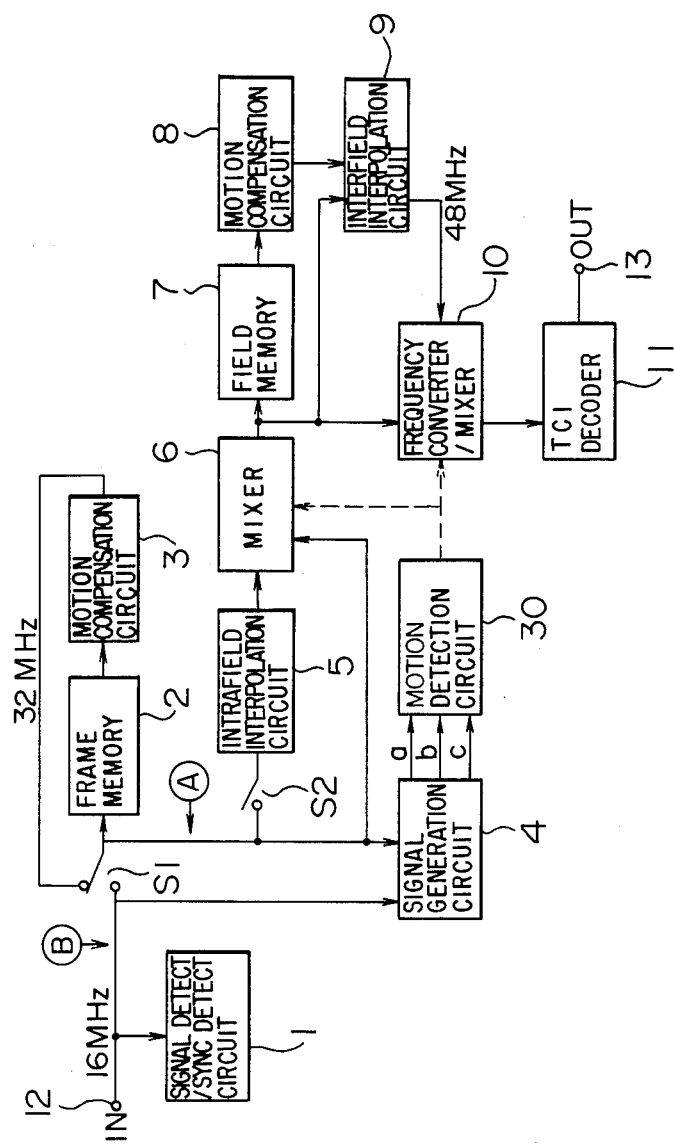
FIG. 1 is a block diagram of the decoder, to which the image motion detection circuit of the present invention is applied, for decoding in the receiver the television transmission signal without the interframe aliased portion in the lower frequency region, as shown in Japanese Patent Unexamined Publication No. 172876/87.

Referring to FIG. 1, the decoder arrangement includes a signal/sync detection circuit 1 which receives the transmission signal (interframe subsampling frequency: 16 MHz) without the interframe aliased portion in the lower frequency region supplied to a signal input terminal 12 and produces a synchronizing signal used for the synchronous control of the decoder. Shown by S1 is a switch for subsample shifting, and it inserts a motion-compensated 1-frame delayed signal provided by a frame memory 2 and motion compensation circuit 3 into the transmission signal received on the input terminal 12 to produce an interframe interpolated signal with a 32 MHz sampling frequency (on the line indicated by Ⓐ in the figure).

The interframe interpolated signal from the switch S1 is entered to one input of a signal generation circuit 4, to an intrafield interpolation circuit 5 by way of a switch S2 which operates in unison with the switch S1, and to one input of a mixer 6. The signal generation circuit 4 has another input receiving the transmission signal from the input terminal 12, and it produces three signals, i.e., the next-adjacent interframe difference signal (a), immediate-adjacent interframe difference narrow-band signal (b) and immediate-adjacent interframe difference broad-band signal (c) as will be described later, necessary for the motion detection circuit 30 to produce the motion signal.

The switch S2 extracts the signal only at the sampling point corresponding to the current field from the signal from the switch S1, the intrafield interpolation circuit 5 implements intrafield interpolation for the extracted signal, and the mixer 6 receives the resulting signal. The mixer 6 intermingles the motion picture system signal from the intrafield interpolation circuit 5 and the still picture system signal from the switch S1 depending on the amount of movement indicated by the output signal from the motion detection circuit 30.

An interfield interpolation circuit 9 operates to interpolate the 1-field delayed signal provided by a field memory 7 and motion compensation circuit 8 into the output signal from the mixer 6, and the resulting interfield interpolated signal is fed to one input of a frequency converter/mixer 10. The frequency converter/mixer 10 has another input receiving a 32-MHz sampling signal from the mixer 6, and the circuit 10 converts its frequency to 48 MHz. The 48-MHz sampling signal is intermingled with the signal from the interfield interpolation circuit 9 depending on the amount of movement indicated by the output signal from the motion detection circuit 30, and the mixed signal is fed to a TCI (Time-Compressed Integration) decoder 11, by which the signal is transformed into an intended television signal and it is delivered to the output terminal.

Figure 2:
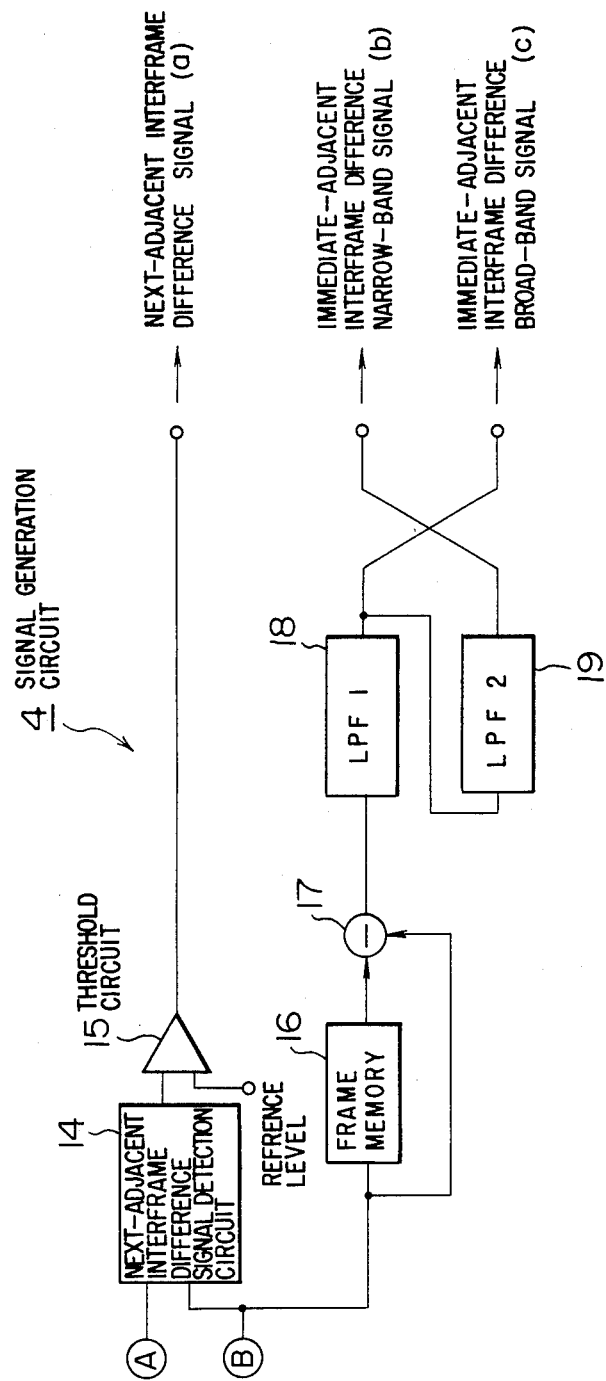
FIG. 2 is a block diagram of the signal generation circuit for generating the three signals to be received by the image motion detection circuit of the present invention.

Next, the arrangement and operation of the signal generation circuit 4 will be described with reference to FIG. 2. In the figure, indicated by 14 is a next-adjacent interframe difference signal detection circuit, with its two input terminals receiving the signals on lines Ⓐ and Ⓑ shown in FIG. 1. Indicated by 15 is a threshold circuit which validates the output signal from the next-adjacent interframe difference signal detection circuit 14 at a certain reference level to provide a next-adjacent interframe difference signal (a) at its output.

Indicated by 16 is frame memory and 17 is a subtracter. The frame memory 16 receives the signal on line Ⓑ in FIG. 1 (the transmission signal with 16-MHz sampling frequency) and the subtracter 17 produces the immediate-adjacent interframe difference signal. The signal is fed through a first low-pass filter 18 with a wide pass band (e.g., −6 dB at 8 MHz) to become an immediate-adjacent interframe difference broad-band signal (c), and it is fed through a second low-pass filter 19 with a narrow pass band connected in cascade with the first low-pass filter 18 to become an immediate-adjacent interframe difference narrow-band signal (b). Namely, the immediate-adjacent interframe difference narrow-band signal (b) passing through the cascade connection of the first and second low-pass filters does not include the aliased porton between frames and is not responsive above 4 MHz, in contrast to the immediate-adjacent interframe difference broad-band signal (c)

which includes the aliased portion between frames and is responsive even above 4 MHz.

Next, the image motion detection apparatus according to the present invention will be described with reference to FIG. 3. The motion detection circuit 30 consists of a frame memory 31, a motion compensation circuit 32, a maximum-value selection circuit 33 having two input terminals, a maximum-value selection circuit 34 having two input terminals, and a minimum-value selection circuit 35 having two input terminals. The circuit 30 has three input terminals 30a, 30b and 30c, and an output terminal 30d which is led out of the minimum-value selection circuit 35. The input terminals 30a, 30b and 30c receive the next-adjacent interframe difference signal (a), immediate-adjacent interframe difference narrow-band signal (b) and immediate-adjacent interframe difference broad-band signal (c), respectively, provided by the signal generation circuit 4. The next-adjacent interframe difference signal (a) on the input terminal 30a is delivered to the input terminal of the frame memory 31 and one input terminal of the maximum-value selection circuit 33, the immediate-adjacent interframe difference narrowband signal (b) on the input terminal 30b is delivered to one input terminal of the maximum-value selection circuit 34, and the immediate-adjacent interframe difference broad-band signal (c) is delivered to one input terminal of the minimum-value selection circuit 35. The frame memory 31, motion compensation circuit 32, maximum-value selection circuits 33 and 34, and minimum-value selection circuit 35 are in a cascade connection, with their other input terminals being connected to receive the outputs of the respective preceding circuits.

Next, the operation of the image motion detection circuit 30 arranged as described above will be explained. The next-adjacent interframe difference signal (a) is received by the frame memory 31 and further modified by the motion compensation circuit 32. The current next-adjacent interframe difference signal (a2) and the modified next-adjacent interframe difference signal (a1) preceding by one frame are supplied to the maximum-value selection circuit 33, which selects the maximum-value between the signals (a1) and (a2). The reason for this scheme is that the next-adjacent interframe difference signal is detected only in every second sample of the picture signal in the MUSE transmission system including the aliased portion in the lower frequency region and in other MUSE transmission system as well.

Subsequently, the next-adjacent interframe difference signal (a') selected by the maximum-value selection circuit 33 and the immediate-adjacent interframe narrow-band signal (b) are supplied to the maximum-value selection circuit 34 which takes the maximum-value of the two signals, so that the next-adjacent interframe signal (a') is selected for an area where a small object has moved, while the immediate-adjacent interframe difference narrow-band signal (b) is selected for an area where a large object has moved. Furthermore, the signal selected by the maximum-value selection circuit 34 and the immediate-adjacent interframe difference broad-band signal (c) are supplied to the minimum-value selection circuit 35, which selects the minimum-value between the two signals and delivers it as a motion signal to the output terminal 30d. Since the immediate-adjacent interframe difference broad-band signal (c) includes the aliased portion, it is needed by areas where small objects have moved.

The immediate-adjacent interframe difference broad-band signal (c) has a certain value due to the aliased portion in response to the movement of a relatively large object in the image. The minimum-value selection circuit 35 selects the immediate-adjacent interframe difference broad-band signal (c) only for necessary areas and it inhibits the signal for unnecessary areas. When an unstable next-adjacent interframe difference signal is generated, the minimum-value selection circuit 35 inhibits the signal, whereby a stable motion signal is produced. The immediate-adjacent interframe narrow-band signal (b) is a signal which is stable in the band below 4 MHz for example.

The signal resulting from the maximum-value selection for the next-adjacent interframe difference signal and immediate-adjacent interframe difference narrow-band signal reveals generally a moving area greater than the actual moving area on the picture because they are natives of individual low-pass filters. Accordingly, by selecting the minimum-value in the output signal from the maximum-value selection circuit 34 and the immediate-adjacent interframe difference broad-band signal by means of the minimum-value selection circuit 35, a motion signal indicating the moving area properly can be produced.

The immediate-adjacent interframe difference broad-band signal (c) is a signal which includes the aliased portion, and therefore it may create a motion signal even for a stationary area in practice. However, when as a special case an image of vertical stripe moves horizontally to coincide with the vertical stripe in the second frame, the next-adjacent interframe difference signal (a) is not produced and the immediate-adjacent interframe difference narrow-band signal (b) having a higher frequency component of the motion signal has its signal level lowered by the low-pass filter, resulting unfavorably in a smaller chance of motion signal generation. In such a case, the immediate-adjacent interframe difference broad-band signal (c), which creates the motion signal at a certain signal level, is used as a motion signal by making smaller the moving area attributable to the immediate-adjacent interframe difference narrow-band signal and next-adjacent interframe difference signal. Although this operation is opposite to the selection of motion signal described above, the signals prescribe each other for certain kinds of pictures to thereby produce a more perfect motion signal.

When the maximum- or minimum-value selection circuit is substituted by the conventional switching circuit as described in Japanese Patent Unexamined Publication No. 172876/87, the circuit may possibly make on-off operations at every second pixel repeatedly in response to signal levels around the threshold level. Since the threshold level is dependent on the kind of picture, it becomes necessary to alter the threshold level for each different picture. In practice, pictures generally have correlations and the on-off operation at every second pixel does not occur frequency; rather the threshold control will cause the aliased portion to appear at every second pixel in a picture. This is an adverse side effect of the switching circuit, and the use of the maximum- or minimum-value selection circuit as in the present invention can reduce the occurrence of this phenomenon significantly. The reason is that the on-off circuit has its threshold level dependent on the nature of picture and the circuit behaves 1-bit control, whereas the maximum- or minimum-value selection circuit behaves more smooth two or more bit control.

In detecting a moving area of picture in the receiver of multiple subsampling transmission system without including the interframe aliased portion in the lower frequency region, application of the method and apparatus of the present invention performs correct moving area detection which could not be achieved in the past and provides a significant improvement in the picture quality.

The image motion detection apparatus of the present invention using the maximum-value selection circuit and minimum-value selection circuit is not confined to the arrangement shown in FIG. 3. The present invention features the extraction of a maximum-value or minimum-value as a motion signal by combining appropriately the next-adjacent interframe difference signal, immediate-adjacent interframe difference narrow-band signal and immediate-adjacent interframe difference broad-band signal by use of the maximum-value selection circuit and minimum-value selection circuit. For the next-adjacent interframe difference signal, immediate-adjacent interframe difference narrow-band signal and immediate-adjacent interframe difference broad-band signal, signals produced by modifying these signals can also be used depending on each requirement. The motion compensation circuit 32 may be located in advance of the frame memory 31.

We claim:

1. A method of detecting the motion of image in a television signal of the multiple subsampling transmission system in which a television signal is transmitted with the transmission bandwidth thereof being compressed so as not to include an interframe aliased portion in a lower frequency region, said method comprising the steps of:

producing three signals including a next-adjacent interframe difference signal, an immediate-adjacent interframe difference narrow-band signal without the interframe aliased portion and an immediate-adjacent interframe difference broad-band signal with the interframe aliased portion;

taking a maximum-value between prescribed two signals among said next-adjacent interframe difference signal or a signal related thereto, said immediate-adjacent interframe difference narrow-band signal or a signal related thereto and said immediate-adjacent interframe difference broad-band signal or a signal related thereto; and taking a minimum-value between a resulting maximum-value signal and a remaining signal other than said two signals so that a resulting minimum-value signal is validated as a motion signal which indicates the motion of image.

2. A method according to claim 1 wherein said step of taking a maximum-value comprising the step of taking a maximum-value between said next-adjacent interframe difference signal or the related signal and said immediate-adjacent interframe difference narrow-band signal or the related signal, and said step of taking a minimum-value comprising the step of taking a minimum-value between a resulting maximum-value signal and said immediate-adjacent interframe difference broad-band signal.

3. A method according to claim 2, wherein said signal related to said next-adjacent interframe difference signal comprises a compensation signal which is produced by taking a maximum-value between said next-adjacent interframe difference signal and a signal produced by motion compensation for a next-adjacent interframe difference signal preceding by one frame.

4. An apparatus for detecting the motion of image in a television signal intended for a decoder for decoding a television transmission signal which has been bandwidth-compressed based on the multiple subsampling transmission system so as not to include an interframe aliased portion in a lower frequency region, said decoder comprising means responsive to said transmission signal for generating a next-adjacent interframe difference signal or a signal related thereto, an immediate-adjacent interframe difference narrow-band signal without the interframe aliased portion or a signal related thereto and an immediate-adjacent interframe difference broad-band signal with the interframe aliased portion, and an image motion detection means for detecting the motion of image in said transmission signal, wherein said image motion detection means comprises:

a first maximum-value selection circuit which receives said next-adjacent interframe difference signal or the related signal and said immediate-adjacent interframe difference narrow-band signal or the related signal to select a maximum-value between said input signals; and a minimum-value selection circuit which receives said immediate-adjacent interframe difference broad-band signal and the output signal from said maximum-value selection circuit to select a minimum-value between said input signals.

5. An apparatus according to claim 4 further comprising a circuit portion including a frame memory in which said next-adjacent interframe difference signal is entered and a motion compensation circuit, and a second maximum-value selection circuit which receives a current next-adjacent interframe difference signal and a motion-compensated next-adjacent interframe difference signal preceding by one frame provided by said circuit portion to select a maximum-value between said input signals, said signal related to said next-adjacent interframe difference signal entered to said first maximum-value selection circuit being a signal compensated by said circuit portion and said second maximum-value selection circuit.

* * * * *

UNITED STATES PATENT AND TRADEMARK OFFICE
CERTIFICATE OF CORRECTION

PATENT NO. : 4,760,446
DATED : July 26, 1988
INVENTOR(S) : NINOMIYA, et al

It is certified that error appears in the above—identified patent and that said Letters Patent is hereby corrected as shown below:

On the title page

Please correct the Assignee to read as follows:

--NIPPON HOSO KYOKAI--.

Signed and Sealed this

Seventeenth Day of January, 1989

*Attest:*

DONALD J. QUIGG

*Attesting Officer*  *Commissioner of Patents and Trademarks*